(No Model.) 4 Sheets—Sheet 1.

A. G. LEMING.
TYPE WRITING MACHINE.

No. 285,141. Patented Sept. 18, 1883.

WITNESSES:

INVENTOR:
A. G. Leming
BY
ATTORNEYS.

(No Model.)  4 Sheets—Sheet 3.

A. G. LEMING.
TYPE WRITING MACHINE.

No. 285,141.  Patented Sept. 18, 1883.

WITNESSES:
Theo. G. Hoster
C. Sedgwick

INVENTOR:
A. G. Leming
BY Munn & Co.
ATTORNEYS.

(No Model.) 4 Sheets—Sheet 4.
A. G. LEMING.
TYPE WRITING MACHINE.
No. 285,141. Patented Sept. 18, 1883.
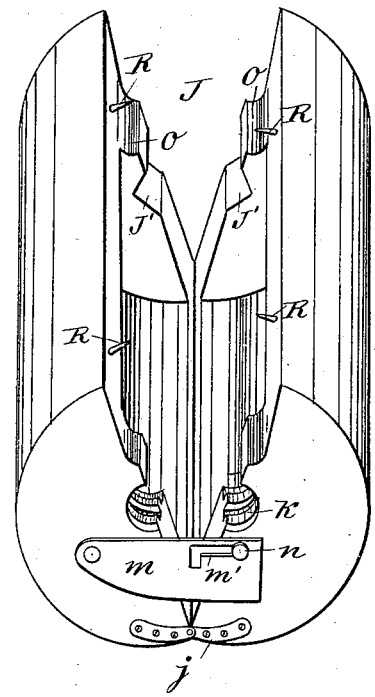
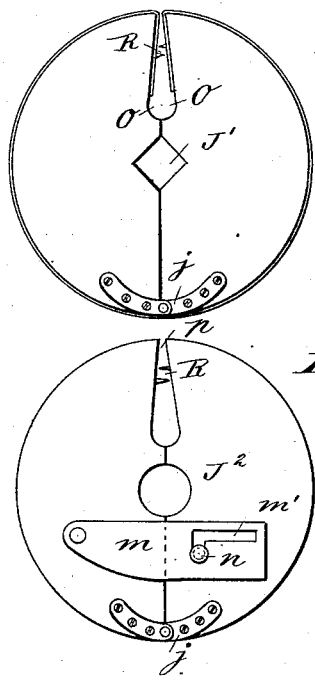
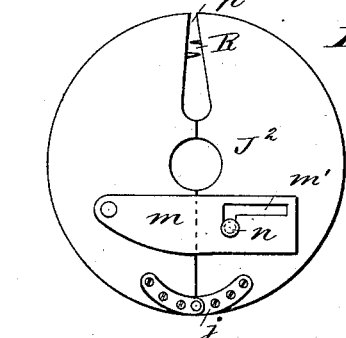
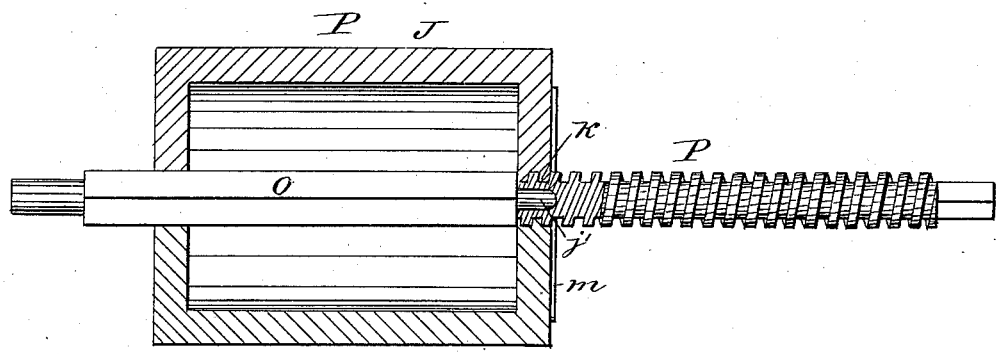
WITNESSES:
INVENTOR:
A. G. Leming
BY
ATTORNEYS.

UNITED STATES PATENT OFFICE.

ADOLPHUS G. LEMING, OF WALDRON, ARKANSAS.

TYPE-WRITING MACHINE.

SPECIFICATION forming part of Letters Patent No. 285,141, dated September 18, 1883.

Application filed January 13, 1883. (No model.)

*To all whom it may concern:*

Be it known that I, ADOLPHUS G. LEMING, of Waldron, in the county of Scott and State of Arkansas, have invented a new and Improved Type-Writing Machine, of which the following is a full, clear, and exact description.

The invention will first be described in connection with the drawings, and then pointed out in the claims.

Reference is to be had to the accompanying drawings, forming part of this specification, in which similar letters of reference indicate corresponding parts in all the figures.

Figure 1:
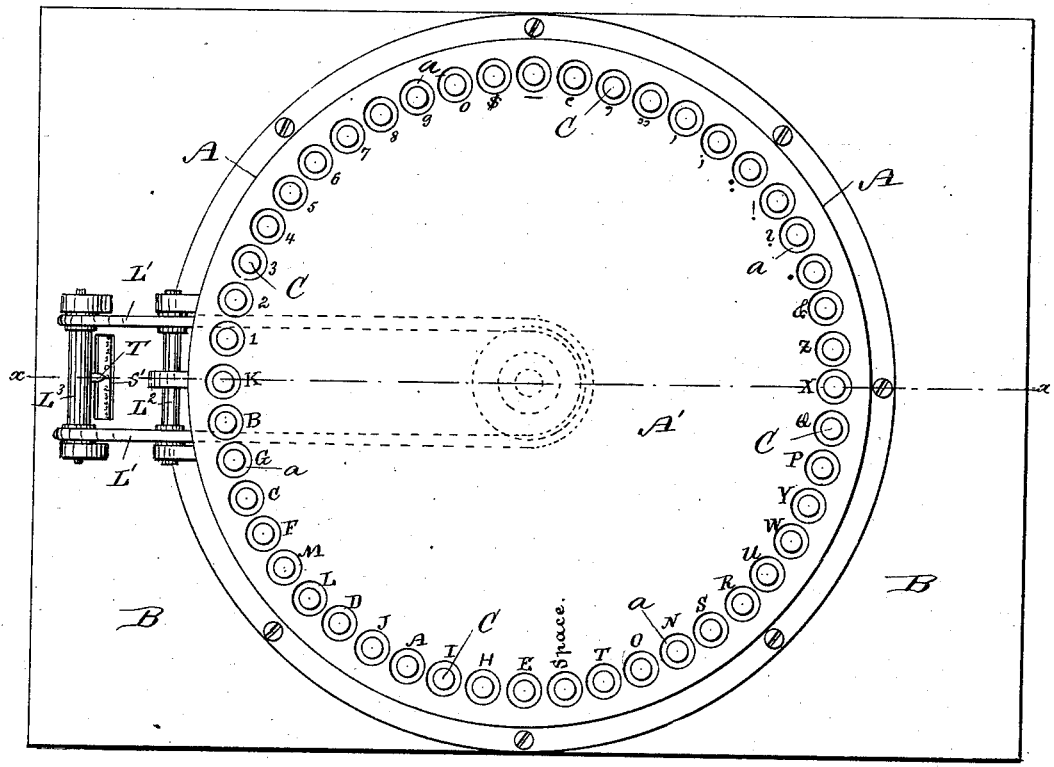
Figure 2:
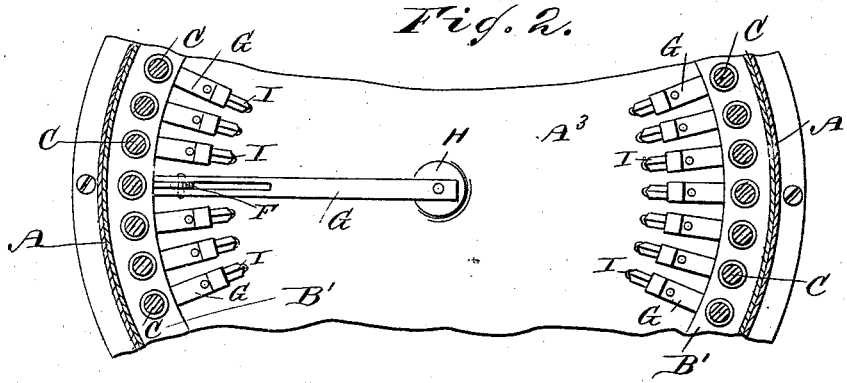
Figure 3:
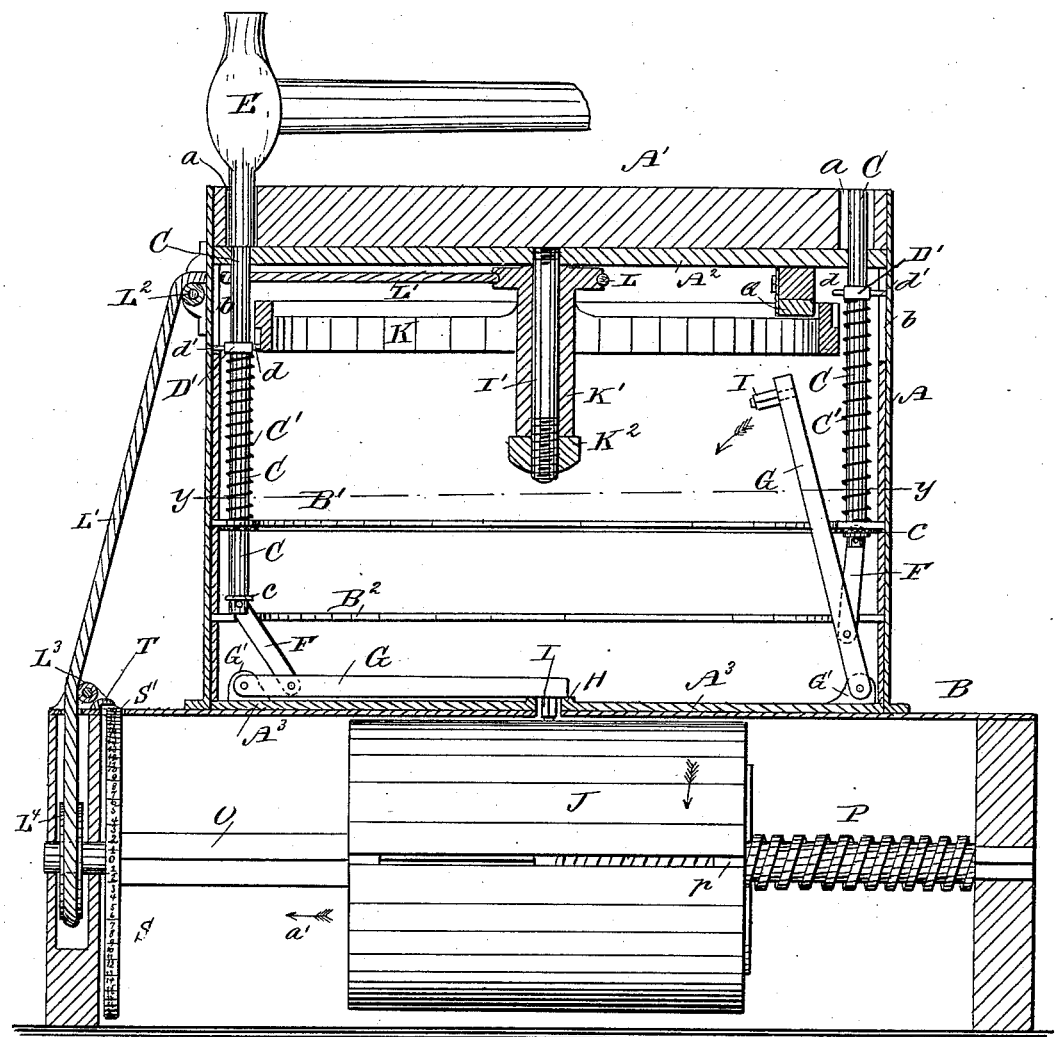
Figure 4:
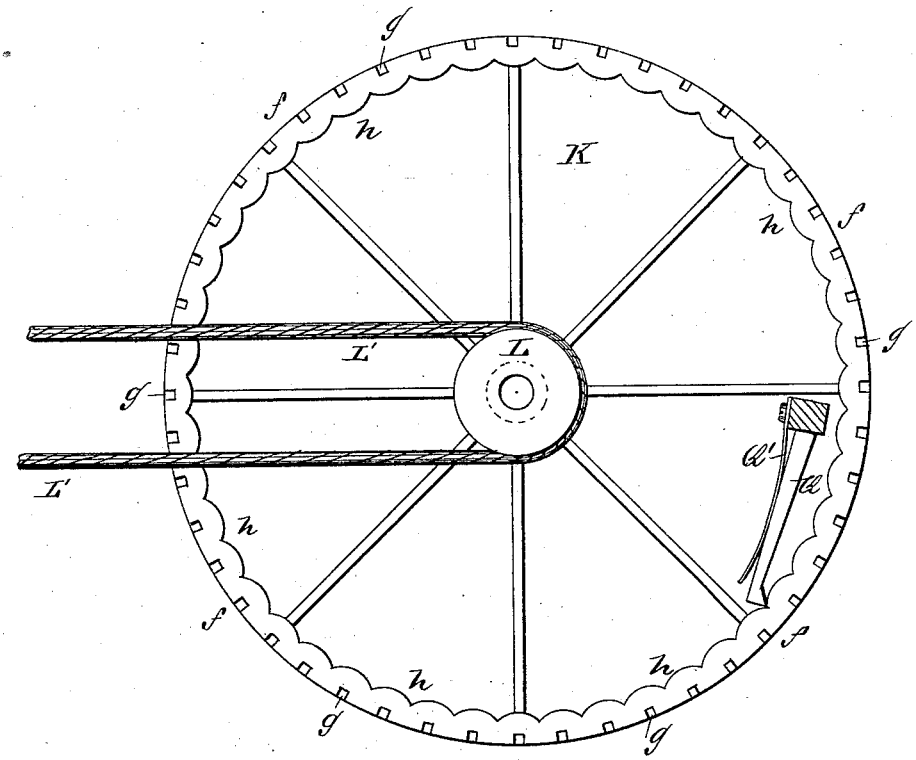
Figure 5:
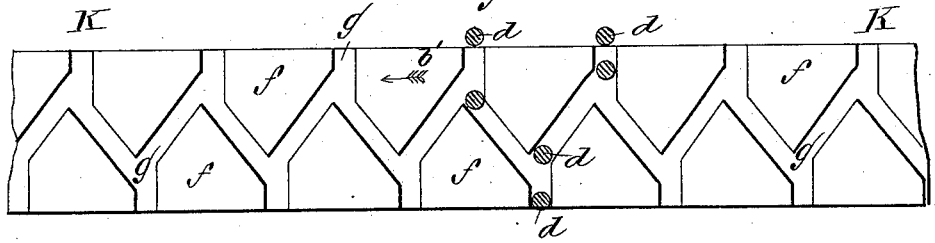
Figure 6:
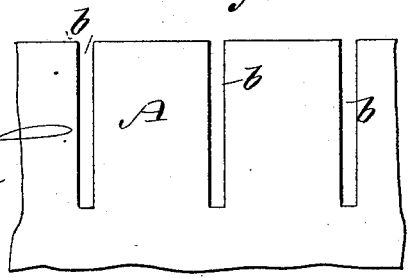

Figure 1 is a plan view of my improved type-writing machine. Fig. 2 is part of a sectional plan view on the line $y\ y$, Fig. 3. Fig. 3 is a longitudinal sectional elevation of the same on line $x\ x$, Fig. 1. Fig. 4 is a plan view of the wheel moved by the keys for the purpose of moving the paper. Fig. 5 is a diagram elevation of the rim of the said wheel. Fig. 6 is a diagram elevation of the inner surface of the cylinder containing the said wheel, the guide-grooves of the cylinder being shown. Fig. 7 is a perspective view of the paper-receiving cylinder, showing the same open. Figs. 8 and 9 are end elevations of the same, showing it closed. Fig. 10 is a longitudinal sectional elevation of the same.

The frame of the machine consists of a cylinder, A, secured on a box, B, open at the bottom. The top plate A' of the cylinder A is provided along its circular edge with a ring of cylindrical openings, $a$, which contain vertical shafts C, connected with the type-levers G. The diameter of the apertures $a$ is slightly greater than the diameter of the shafts C. The keys or shafts C are depressed by means of a hammer, E, one end of which is tapered to pass into the apertures $a$. Each aperture $a$ is provided with a letter, numeral, or punctuation-mark on the top of the cylinder A, and one of them is marked "space," as shown in Fig. 1 of the drawings. The shaft C, contained in the hole marked "space," is not provided with a type-lever, G.

Below the top plate A' of the cylinder A a plate, A², is secured, which is provided with apertures corresponding to the apertures $a$ in the top plate A', the apertures in the plate A² being of such a size that the shafts C fit closely therein, and are thus guided in their vertical movements. The lower ends of the shafts C pass through apertures in a ring, B', projecting from the inner surface of the cylinder A, and above the said ring B' each shaft C is surrounded by a spiral spring, C', which is held between the ring B' and a collar, D', on the shaft C, which collar is provided with two pins, $d$ and $d'$, which project in diametrically-opposite directions. The pins $d$ project toward the center of the cylinder A, and the pins $d'$ project into vertical grooves or slots $b$ in the inner surface of the cylinder A, whereby the said shafts C will be prevented from turning, and will be guided in their vertical movements. At its lower end each shaft C is provided with a collar, $c$, which strikes against the bottom of the ring B' when the shaft is raised by the spring C', thereby preventing the shaft C from being raised too high, for the distance from the upper edge of the collar $c$ to the lower surface of the ring B', when the shafts are at their lower position, is equal to the distance from the upper surface of the top plate A² to the upper surface of the plate A', so that when the shafts C are raised their upper ends will not project above the upper surface of the plate A'. The lower end of each shaft C is slitted, and in the said slitted end a connecting-rod, F, is pivoted, the other end of which is pivoted in the longitudinally slitted or slotted lower end of a type-lever, G, pivoted to a vertical jaw, G', projecting from the upper surface of the bottom plate, A³, of the cylinder A, at or near the circular edge of the same. The said vertical jaws G' of the several type-levers G are arranged in a circle.

The connecting-rod F is pivoted to the type-lever G a short distance above that end of the type-lever which is pivoted to the jaw G'. Below the ring B' a ring, B², projects from the inner surface of the cylinder A, against which ring B² the lower ends of the shafts C strike when the shafts are lowered. The lower end of each type-lever G must be slitted, so that the connecting-rod F can pass into the said type-lever when the type-lever is raised, as shown in the right-hand end of Fig. 3. I have shown only two type-levers G and corresponding shafts C.

The bottom plate, A³, of the cylinder A is provided at its center with an aperture, H, through which the type-blocks I, secured on the under surfaces at the free ends of the type-levers G, can pass, which type-locks I are of such length that they can pass through the aperture H and strike against a sheet of paper wound on a cylinder, J, directly below the under surface of the bottom plate, A³, which cylinder J is contained in the box B. A shaft or spindle, I', projects downward from the under surface of the plate A², and on the same is loosely mounted a hub, K', of a horizontal wheel, K, which is held in place on the spindle I' by a nut, K², screwed on the lower end of the spindle I'.

Above the wheel K a grooved pulley, L, is rigidly mounted on the hub K', or made integral with the same, and around the said pulley L a belt or cord, L', passes, which passes over guide-pulley L² on the outside of the cylinder A, over guide-pulleys L³ on the upper surface of the box B, and then around a grooved pulley, L⁴, mounted on one end of the squared part O of the shaft on which the cylinder J is mounted, whereby when the wheel K is rotated the cylinder J will also be rotated. The outer end of the wheel K is divided into an upper and lower row of pentagonal teeth, $f$, which are separated by grooves $g$, the bases of the pentagons being at the upper and lower edges of the rim of the wheel.

The teeth are not equilateral pentagons, for the sides near the edges of the rim of the wheel being taken for the bases, the sides on the right and left of the bases form right angles with the said base, and the sides at the left, both of the upper and lower sets of teeth, are longer than the sides at the right. Of the other two sides, which form the apex of the pentagon, the one to the right is longer than the one to the left, the apex of each tooth pointing to and being on a vertical line with the right-hand side of a tooth of the opposite row. The teeth are all of the same size, and the same number is in each row as there are shafts C. When the shafts C are at rest, the pins $d$ stand exactly above the upper ends of the grooves $g$, and thus do not interfere with the revolving of the wheel K. The wheel K is provided on the inner surface of its rim with a series of curved teeth, $h$, one for each shaft C, the center of each tooth corresponding with a groove, $g$, between the upper row of teeth $f$, as shown in Fig. 4. A pawl, Q, pivoted to the under side of the plate A², is pressed against the teeth $h$ by a spring, Q'. The tension of the spring Q' is not very great, so as not to interfere with the easy movement of the wheel K.

The cylinder J, on which the paper is fastened, is composed of two semi-cylindrical sections, which are hinged to each other at each end by hinges $j$, the turning-points of which are at the periphery of the cylinder. In one end the cylinder is provided with a squared hole, J', for receiving the end of the square shaft O, journaled to turn on its longitudinal axis at one end in the box B, and at the other end in a bearing, $j'$, in the end of a screw, P; and at the opposite end the cylinder J has a circular aperture, J², which is provided with screw-threads $k$, and is adapted to receive the end of the screw P which is fixed in the box B, the longitudinal axis of the screw being a continuation of the longitudinal axis of the shaft O.

The two sections of the cylinder J can be locked together by a latch-plate, $m$, pivoted to one of the sections, and provided at its free end with an L-shaped slot, $m'$, through which a headed screw or stud, $n$, passes into the end of the other section.

Each end of each section of the cylinder J is provided with a recess, $o$, for receiving the edges of the paper, which recesses are connected by an open seam, $p$, extending longitudinally over the surface of the cylinder. The longitudinal edges of the swinging sections of the cylinder are provided with studs R R, which are passed through the paper inserted between the said edges for the purpose of holding the sheet on the cylinder. The cylinder J is covered with rubber or some other soft material to prevent clattering of the type on the cylinder. The lower surface of the ring B' is also covered with rubber or some other elastic or sound-deadening material, to prevent the collars $c$ from clattering against the said ring B' when the shafts C are raised by the springs C'. The upper surfaces of the ring B² and plate A³ and the point of the hammer E must be covered with rubber, felt, or some analagous material, to prevent noise.

On the shaft O an index-wheel, S, is mounted, which shows through a slot, S', in the top of the box B, over the center of which slot a pointer, T, on the top of the box projects. On its rim the index-wheel S may be provided with the numerals running from 0 to 9 in opposite directions—that is, the numerals run in regular order from 0 to 9, then from 9 to 0, and then again from 0 to 9; or the numbering may continue on around the rim of the wheel S, as shown in Fig. 3 of the drawings, until the numbers meet on the opposite side, the numerals being spaced the same distance as the letters are to be spaced on the paper held on the cylinder J, if the diameter of the wheel S is the same as the diameter of the cylinder J. If the diameter of the wheel S is greater than the diameter of the cylinder J, the numerals on the wheel S must be placed proportionately.

The operation is as follows: The sheet is fastened on the cylinder J, and the operator strikes the keys or shafts C with the hammer E in the order in which the types are to appear on the paper. By striking a shaft C with the hammer, the shaft will be depressed until the hammer strikes the plate A², whereby the connecting-rod F will swing the type-lever G downward, as indicated by the arrows in Fig. 3, and the type-block I of the said type-lever passes through the aperture H in the bottom plate, A³, and strikes the cylinder J. A sheet of carbon paper can be passed around the sheet on the cylinder J and fastened with it, whereby a colored impression of the letter will be produced on the sheet; or a printing-band, as in other type-writers, can be provided below the plate A³, so that the type-blocks I will strike the said ribbon and press part of the same on the paper on the cylinder J, thus making an impression. Every time a shaft C is depressed, the pin $d$ on the same acts on the teeth $f$ of the wheel K and rotates the said wheel in a manner that will be described hereinafter. The cord L′ transmits the motion of the wheel K to the pulley L⁴ and shaft O, thereby rotating the cylinder J, into the end of which the shaft O is passed. As the fixed screw P passes into the other end of the cylinder J, the cylinder J will be moved in the direction of the arrow $a'$ very slowly as it revolves on the screw, and the letters will be printed on the sheet passed around the cylinder J in a spiral line. After the sheet has been filled, it is removed and replaced by another. Ordinarily the pins $d$ stand above the grooves $g$, as shown in Fig. 5. If a vertical shaft C is depressed, the corresponding pin, $d$, passes into the corresponding groove, $g$, until it strikes the apex of the tooth $f$ directly below the corresponding groove, $g$, and as the pin $d$ can only move on a vertical line, and as it strikes against the long inclined side of a pentagonal tooth, the wheel K will be moved in the direction of the arrow $b'$ until the vertical left-hand side of the next lower tooth to the right comes against the pin $d$, which stops the motion of the wheel; but the pin goes on down to the bottom edge of the rim of the wheel, but not below it nor out of the groove. By that time the shaft C has been depressed as far as it can be, and the type-lever has been swung down. The spring C′ then raises the shaft C, and the pin $d$ strikes against the long inclined side of the upper pentagonal tooth $f$, which was brought above it by the above-mentioned movement of the wheel, and again pushes the wheel K in the direction of the arrow $b'$ till the vertical left-hand side of the next upper tooth to the right comes against the pin, which again stops the motion of the wheel and the pin rises to its ordinary position above the rim of the wheel. The pawl Q slides on one of the curved teeth $h$ while the pin $d$ is descending and ascending, and drops into one of the notches between said teeth when the wheel K is stopped as the pin $d$ ascends, and thereby holds said wheel so that the grooves $g$ will be centrally under the pins $d$ when the said pins are all above the rim of the wheel, and also prevents the wheel from being moved in the direction opposite to the arrow $b'$. As the motion of the wheel K is transmitted to the shaft O, the cylinder J will be moved twice on its longitudinal axis between every two impressions by the types, which two movements are together equal to the space between two letters in a word and that occupied by one of the letters. To remove the cylinder J, the latch $m$ is depressed so that the stud $n$ passes into the long shank of the slot $m'$, and the two sections of the cylinder J are thrown apart, the pin $n$ preventing the sections from being opened too far as it strikes against the end of the long shank of the slot. The sheet of paper to be written on is wrapped around the cylinder J, with the end intended for the top of the page at the left-hand end of the cylinder, and the side edges turned into the open side of the cylinder and secured by being pressed down on the pins R. The cylinder is then placed on the axle, with the open side from the operator, the type-writer being inverted, so that when the cylinder is closed and the machine is turned right side up the seam $p$ in the cylinder will be centrally under the aperture H. If it is desired to begin writing on the upper left-hand corner of the page, the thread $k$ in the hole J² of the cylinder J is placed in the first round at the right-hand end of the groove of the screw to place the left-hand end of the cylinder far enough past the opening H for one line. As the first key is depressed, the cylinder J revolves half the distance allowed for one letter and space, which brings the seam $p$ forward of the opening H, and the upper left-hand corner of the outside page comes under it and stops until the letter is stamped on the sheet. Then, after the type has left the cylinder far enough to avoid blurring the letter, the cylinder moves again, following the motion of the wheel K, as above described, and as the wheel K is moved the same distance by each key the letters will be spaced properly on the sheet on the cylinder J. The operator continues to strike the keys as rapidly as he can until the word is completed. Then he strikes the space-key or a punctuation-key, and then strikes the keys for the next word, and so on until a line around the cylinder is completed. As the circumference of the cylinder corresponds to the number of full spaces made by the keys on each line, the seam $p$ is again centrally under the opening H, and the cylinder having moved lengthwise to the left with the thread of the screw which is just the length on the cylinder J required for one line and line-space, there is no time taken up in shifting the paper from one side to the other, nor in dropping to the next line; but the new line begins on the cylinder at and below the end of the preceding line, and, as the seam $p$ is no wider than the space between the letters of a word, all the operator has to do when one line is finished is to tap the key for the first letter of the next line and continue as before until the whole page is written, taking no notice of the seam except to avoid dividing the letters of a word improperly on different sides of the page. To avoid this I have provided the wheel S, which is so arranged on the shaft O that its zero corresponds exactly with the seam $p$ in the cylinder J, and is under the pointer T when the seam $p$ is under the opening H, so that notwithstanding that the cylinder cannot be seen by the operator while writing, the operator can tell when he has just sufficient spaces on the right hand of the page for nine letters, or any less number, by noticing the numbers on the wheel S as they pass under the pointer T, for the 9 passes under the pointer first, then the 8, and so on, and thereby the operator can tell how much of this distance to fill with spaces to make the syllables and words come out full at the ends of the lines, and when to put in the hyphens. Likewise, after the zero passes under the pointer, the numbers running in the opposite direction show him what number of spaces from the left-hand side of the paper have passed under the opening H, and he can thus properly begin his paragraphs.

If it is desired to begin writing one, two, or any number of spaces from the left-hand edge of the page, the operator just strikes the space-key that number of times, and in this way may begin as many spaces from the edge as he desires; and if it is desired to leave any part of a line blank, this is accomplished by tapping the space-key until the cylinder revolves the required distance; or if it is desired to leave a whole line or two or more blank after beginning to write, this may be quickly accomplished by taking hold of the cord L', and pulling downward until the cylinder J revolves once or more, as may be desired; or if a paragragh ends before the last line is full, the balance of the revolution may be made in the same way; but if it is desired to leave the top of the page blank the width of one, two, or any number of lines, the cylinder is so placed that the thread in the opening $J^2$ will be in the second, third, or fourth round of the groove of the screw P, at the right-hand end. As the whole page appears to be one continuous line winding around the cylinder like the threads of a screw, the right-hand ends of the lines will be one space lower than the left; but they will be straight, the ends will be even, and the edges of the paper turned into the opening at the side of the cylinder will make good margins at the sides of the page.

In place of printing the letters on the sheet, they may be stamped on it; but in that case an extra covering must be on the cylinder; or a larger cylinder must be used, so that it will be nearer to the plate $A^3$. The length of the page is the length of the cylinder, and the width of it depends upon the circumference of the cylinder, except that the edges which are turned into the open side of the cylinder form the side margins of the page, and make its width that much greater than the circumference of the cylinder.

The distance which the cylinder is revolved by the depression of one key may be shortened or lengthened by enlarging or diminishing one or the other of the pulleys L or $L^i$, but must always be regulated so that a number of full spaces will extend from the center of the seam $p$ around the cylinder to the same line again, in order that the seam shall never be under a type, but always in the space between the letters.

The space between the lines is regulated by the thread of the screw P. Consequently the machine may be made with a small or large cylinder, and regulated to move the distance required for small type, by which means a great amount of matter can be written on one page, which avoids losing time by changing a sheet on the cylinder.

The length and width of the cylinder and the size of the type are not limited by any distinct proportion to each other. Consequently the cylinder J and the mechanism for operating the same can be replaced by others of different sizes.

As the shafts C do not project above the upper surface of the plate A', they cannot be depressed accidently by the hands or fingers, but can only be depressed by means of the hammer, or other instrument with a similar point; but the plate A' may be removed and the machine operated without it, when the other end of the hammer may be used, which is of just sufficient width so that it cannot strike two keys at the same time.

Having thus fully described my invention, I claim as new and desire to secure by Letters Patent—

1. The combination, with the cylinder J, of the shaft C, carrying the pin $d$, the wheel K, having the teeth $f$, the cord L', the pulley $L^i$, the shaft O, and the screw P, as and for the purpose described.

2. A type-writing machine constructed with a series of type-levers connected with shafts C, contained in apertures $a$ in a top plate A', which shafts C are adapted to be operated by a hammer, the point of which is adapted to be passed into the apertures $a$, substantially as herein shown and described, and for the purpose set forth.

3. In a type-writing machine, the combination, with the cylinder A, of the type-levers G, the connecting-rods F, and the vertical shafts C, having their upper ends held flush with the top of the cylinder A by springs C', surrounding the said shafts, substantially as herein shown and described, and for the purpose set forth.

4. In a type-writing machine, the combination, with the cylinder A, of the shafts C, the springs C', the connecting-rods F, the type levers G, and the top plate A', the thickness of which is equal to the distance that the shafts C are to be depressed by the hammer, substantially as herein shown and described, and for the purpose set forth.

5. A type-writing machine having the paper-receiving cylinder mounted at one end on a squared shaft and at the other end on a screw, substantially as herein shown and described, and for the purpose set forth.

6. In a type-writing machine, the combination, with the cylinder for receiving the paper, of a fixed screw passing into one end of the cylinder, a shaft passing into the other end of the cylinder, and of devices for rotating the shaft, substantially as herein shown and described, and for the purpose set forth.

7. In a type-writing machine, the combination, with the vertical shafts C, having pins $d$, of a wheel, K, provided in its rim with grooves through which the studs or pins $d$ can pass, and of devices for transmitting the motion of the wheel K to the paper-receiving cylinder, substantially as herein shown and described, and for the purpose set forth.

8. In a type-writing machine, the combination, with the vertical shafts C, connected with the type-levers and provided with pins $d$, of the horizontal wheel K, provided with two rows of pentagonal teeth, $f$, forming the grooves $g$, and of devices for transmitting the motion of the wheel K to the cylinder for receiving the sheet of paper, substantially as herein shown and described, and for the purpose set forth.

9. In a type-writing machine, the combination, with the vertical shafts C, connected with the type levers and provided with pins $d$, of the horizontal wheel K, provided with two rows of pentagonal teeth, $f$, forming grooves $g$, devices, substantially as described, for transmitting the motion of the wheel K to the cylinder for receiving the sheet of paper, and of a spring-pawl for assisting the pins $d$ in checking the movements of the wheel K and for holding it in position, substantially as herein shown and described, and for the purpose set forth.

10. In a type-writing machine, the combination, with the vertical shafts C, connected with the type-levers, of the wheel K, provided in its rim with grooves for receiving the pins on the shaft C, the pulley L, connected with the wheel K, the belt L', and the pulley on the shaft of the paper-carrying cylinder, substantially as herein shown and described, and for the purpose set forth.

11. In a type-writing machine, the combination, with the vertical shaft C, connected with the type-levers, of the wheel K, the spindle I', the nut $K^2$, the cord L', the pulleys $L^2$ $L^3$, and the pulley $L^4$ on the shaft of the paper-receiving cylinder, substantially as herein shown and described, and for the purpose set forth.

12. In a type-writing machine, the wheel K, provided in its rim with two rows of pentagonal teeth, $f$, having their bases at the upper and lower edges of the rim, respectively, substantially as herein shown and described, and for the purpose set forth.

13. In a type-writing machine, the wheel K, provided in its rim with two rows of pentagonal teeth, $f$, having their bases at the upper and lower edges of the rim, respectively, and having one vertical side of each pentagon longer than the other, and one inclined side longer than the other, the short straight or vertical side being opposite the short inclined side, and the long inclined side being opposite the long straight side, the apex of each tooth pointing to and being on a vertical line with the right-hand side of a tooth of the opposite row, substantially as herein shown and described, and for the purpose set forth.

ADOLPHUS G. LEMING.

Witnesses:
C. C. STONE,
T. W. STONE.